US011385092B2

(12) United States Patent
Soratkal

(10) Patent No.: US 11,385,092 B2
(45) Date of Patent: Jul. 12, 2022

(54) SUPPRESSANT DETECTION BASED ON CAPACITIVE SENSING

(71) Applicant: Carrier Corporation, Palm Beach Gardens, FL (US)

(72) Inventor: Sreeramya Soratkal, Hyderabad (IN)

(73) Assignee: Carrier Corporation, Palm Beach Gardens, FL (US)

( * ) Notice: Subject to any disclaimer, the term of this patent is extended or adjusted under 35 U.S.C. 154(b) by 231 days.

(21) Appl. No.: 16/803,035

(22) Filed: Feb. 27, 2020

(65) Prior Publication Data

US 2021/0270660 A1 Sep. 2, 2021

(51) Int. Cl.
*G01F 23/26* (2022.01)
*G01F 23/263* (2022.01)
*A62C 37/50* (2006.01)

(52) U.S. Cl.
CPC ............ *G01F 23/266* (2013.01); *A62C 37/50* (2013.01)

(58) Field of Classification Search
CPC ...... G01F 23/266; G01F 23/268; A62C 37/50
See application file for complete search history.

(56) References Cited

U.S. PATENT DOCUMENTS

| | | | | |
|---|---|---|---|---|
| 5,224,550 A | * | 7/1993 | Bragg | A62C 31/05 169/61 |
| 2004/0164868 A1 | * | 8/2004 | Thomas | F17C 13/025 340/605 |
| 2007/0102167 A1 | * | 5/2007 | Rousseau | A62C 13/76 169/85 |
| 2009/0120654 A1 | * | 5/2009 | Gauthier | A62C 13/64 229/93 |
| 2017/0120089 A1 | * | 5/2017 | Fisher | A62C 35/10 |
| 2017/0151453 A1 | * | 6/2017 | Popp | A62C 5/006 |
| 2017/0199070 A1 | * | 7/2017 | Bayerl | G01F 23/263 |

FOREIGN PATENT DOCUMENTS

| | | | |
|---|---|---|---|
| CN | 112629619 A | * | 4/2021 |
| CN | 112697227 A | * | 4/2021 |
| DE | 3731793 A1 | | 3/1989 |

OTHER PUBLICATIONS

Kidde Fire Systems, Kidde Engineered Fire Suppression System, Designed for use with 3M Novec 1230 Fire Protection Fluid Design, Installation, Operation and Maintenance Manual, P/N 45-N1230M-001, Feb. 2005.

(Continued)

*Primary Examiner* — Francis C Gray
(74) *Attorney, Agent, or Firm* — Carlson, Gaskey & Olds, P.C.

(57) ABSTRACT

An example fire suppression system includes a cylinder having a wall defining an inner chamber, and a processor operable to determine an amount of a suppressant in the inner chamber based on a capacitance between a first electrode and a second electrode that are both in contact with the suppressant. An example method for determining an amount of suppressant in a cylinder includes measuring a capacitance between a first electrode and a second electrode that are both in contact with a suppressant within a cylinder, and a determining an amount of suppressant within the cylinder based on the capacitance.

10 Claims, 4 Drawing Sheets

(56) References Cited

OTHER PUBLICATIONS

U.S. Appl. No. 62/773,260, "Printed Capacitive Liquid Level Sensor for Fire Suppression," filed Nov. 30, 2018.
U.S. Appl. No. 62/773,272, "Magnetic Trap Suppression Tank Level Sensor," filed Nov. 30, 2018.
U.S. Appl. No. 62/773,286, "Adaptable Suppression Tank Level Sensor," filed Nov. 30, 2018.
U.S. Appl. No. 62/773,459, "Fire Suppression System Remote Monitoring," filed Nov. 30, 2018.
U.S. Appl. No. 62/773,350, "Suppression Tank Scale and Level Determination," filed Nov. 30, 2018.
U.S. Appl. No. 62/773,450, "Fire Suppression System Remote Monitoring," filed Nov. 30, 2018.
European Search Report for European Application No. 20159312.6 completed on Jun. 23, 2020.

\* cited by examiner

SUPPRESSANT DETECTION BASED ON CAPACITIVE SENSING

CROSS-REFERENCE TO RELATED APPLICATIONS

This application claims the benefit of Indian Provisional Application No. 201911007926, filed on Feb. 28, 2019, the disclosure of which is incorporated by reference herein in its entirety.

BACKGROUND

This disclosure relates to fire suppression systems, and more particularly to detecting an amount of suppressant in a fire suppression cylinder.

A "clean agent" is a type of fire suppressant. A clean agent fire suppression system extinguishes fires by creating a fire extinguishing atmosphere consisting of agent vapor or gas mixed with the air within the protected space. Clean agent systems may be used in buildings and other such structures and areas to suppress fires without water, powder or foam so not as to destroy or damage an enclosed area of the structure and/or equipment contained therein.

Sensors like magnetic float and reed switch based techniques are currently used to determine the level of clean agent present in a suppression cylinder. However, these devices have traditionally only been useful for welded, not seamless, cylinders, and the process of determining the level of clean agent based on readings from these devices is tedious.

SUMMARY

A fire suppression system according to an example of the present disclosure includes a cylinder having a wall defining an inner chamber, and a processor operable to determine an amount of a suppressant in the inner chamber based on a capacitance between a first electrode and a second electrode that are both in contact with the suppressant.

In a further embodiment of any of the foregoing embodiments, each of the first electrode and second electrode are also in contact with a pressurant in the inner chamber.

In a further embodiment of any of the foregoing embodiments, the capacitance has an effective capacitance based on a first capacitance between the first and second electrodes with the suppressant as a dielectric medium, and a second capacitance between the first and second electrodes with the pressurant as a dielectric medium.

In a further embodiment of any of the foregoing embodiments, a siphon tube is disposed within the inner chamber and is spaced apart from the wall. One of the first and second electrodes includes the siphon tube, and the other of the first and second electrodes includes the wall.

In a further embodiment of any of the foregoing embodiments, the siphon tube and cylinder are concentric.

In a further embodiment of any of the foregoing embodiments, the effective capacitance is also based on a stray capacitance of each of the siphon tube and the wall.

In a further embodiment of any of the foregoing embodiments, the siphon tube includes opposing first and second ends, the first end coupled to an output of the cylinder, the second end proximate to a base portion of the wall, the cylinder including a gap between the second end and the base portion, the stray capacitance indicative of a size of the gap.

In a further embodiment of any of the foregoing embodiments, the determination of the amount of suppressant in the inner chamber is based on, a radius of the siphon tube, a radius of the cylinder, a dielectric constant of the suppressant, a dielectric constant of the pressurant, and a size of the gap between the base portion of the cylinder and the second end of the siphon tube.

In a further embodiment of any of the foregoing embodiments, the processor is operable to determine the amount of suppressant in the inner chamber based on a predefined mapping between capacitance values and suppressant amounts for the cylinder.

A further embodiment of any of the foregoing embodiments includes, the processor is operable to display an indication of the amount of suppressant on an electronic display.

A further embodiment of any of the foregoing embodiments, a measuring circuit is operable to measure the capacitance between the first and second electrodes and provide the measured capacitance to the processor.

A method for determining an amount of suppressant in a cylinder according to an example of the present disclosure includes measuring a capacitance between a first electrode and a second electrode that are both in contact with a suppressant within a cylinder, and determining an amount of suppressant within the cylinder based on the capacitance.

In a further embodiment of any of the foregoing embodiments, each of the first electrode and second electrode is also in contact with a pressurant within the cylinder.

In a further embodiment of any of the foregoing embodiments, the capacitance is an effective capacitance based on a first capacitance between the first and second electrodes with the suppressant as a dielectric medium, and a second capacitance between the first and second electrodes with the pressurant as a dielectric medium.

In a further embodiment of any of the foregoing embodiments, the effective capacitance is also based on a stray capacitance of each of the first and second electrodes.

In a further embodiment of any of the foregoing embodiments, measuring a capacitance between a first electrode and a second electrode includes utilizing a wall of the cylinder as one of the first and second electrodes, and utilizing a siphon tube disposed within the cylinder as the other of the first and second electrodes.

In a further embodiment of any of the foregoing embodiments, determining an amount of suppressant within the cylinder is based on each of the following: a radius of the siphon tube, a radius of the cylinder, a dielectric constant of the suppressant, a dielectric constant of the pressurant, and a size of a gap between a base portion of the cylinder and an end of the siphon tube.

In a further embodiment of any of the foregoing embodiments, determining an amount of the suppressant within the cylinder based on the capacitance is performed using a predefined mapping between capacitance values and suppressant amounts for the cylinder.

A fire suppression system according to an example of the present disclosure includes a cylinder comprising a wall defining an inner chamber, a siphon tube disposed within the inner chamber and spaced apart from the wall, and a processor operable to determine a level of suppressant in the inner chamber based on a capacitance between the wall and the siphon tube.

In a further embodiment of any of the foregoing embodiments, the capacitance is an effective capacitance based on a first capacitance between the siphon tube and wall with the suppressant as a dielectric medium, and a second capacitance between the siphon tube and wall with a pressurant as a dielectric medium.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
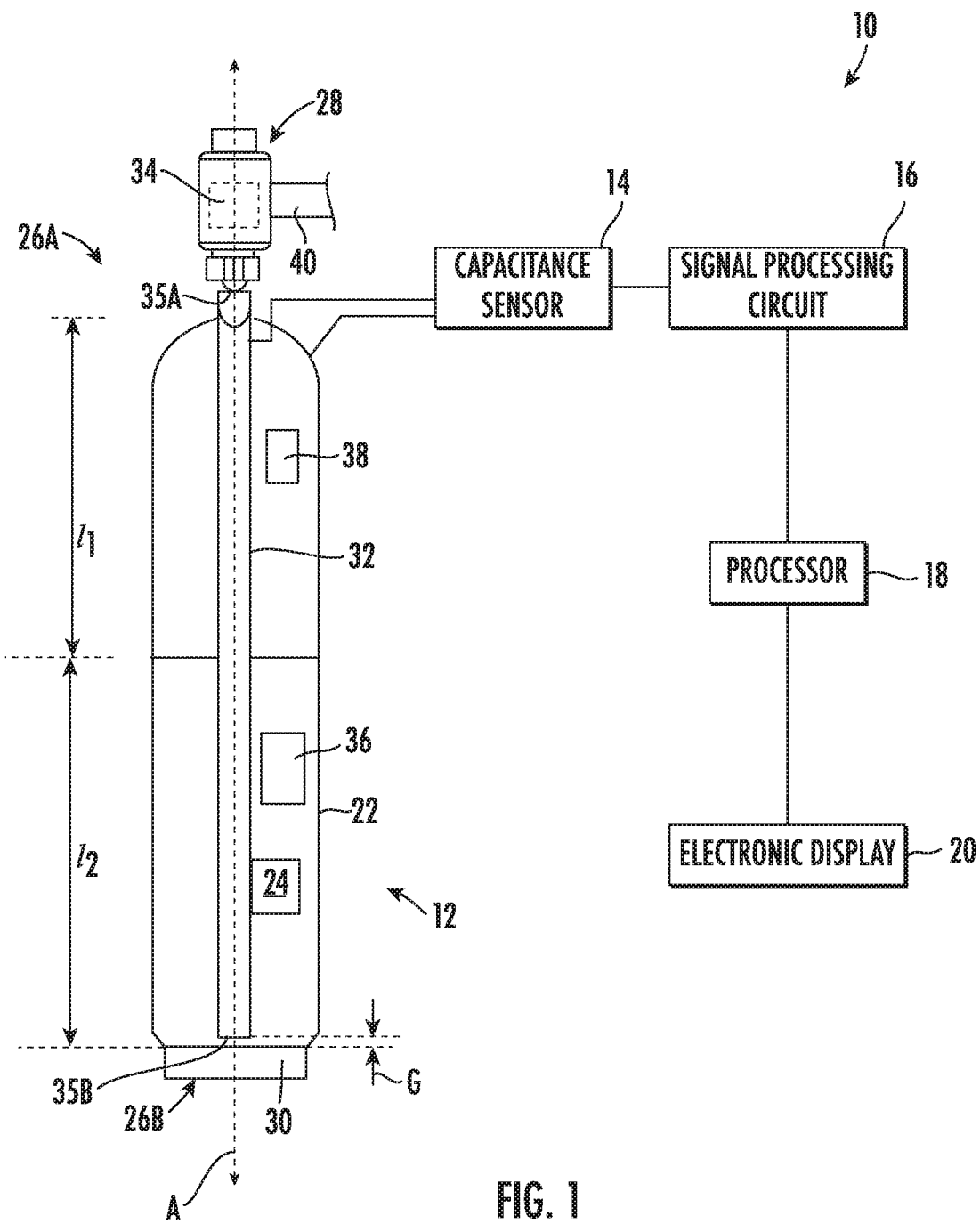
FIG. 1 is a schematic view of an example fire suppression system.

FIG. 1 is a schematic view of an example fire suppression system 10 that is operable to determine a level of suppressant within a cylinder 12 based on capacitive sensing. The fire suppression system 10 includes the cylinder 12, a capacitance sensor 14, a signal processing circuit 16, a processor 18, and an electronic display 20.

The cylinder 12 includes a wall 22 defining an inner chamber 24. The cylinder 12 has opposing first and second ends 26A-B. A control head 28 is disposed at the first end 26A of the cylinder 12, and a base portion 30 of the wall 22 is disposed at the second end 26B of the cylinder 12.

A siphon tube 32 is disposed within the cylinder 12 and provides for fluid communication between the inner chamber 24 and an output valve 34 in the control head 28. The siphon tube 32 is spaced away from the wall 22. The siphon tube 32 includes opposing first and second ends 35A-B. The first end 35A is proximate to the control head 28 and the second end 35B is proximate to the base portion 30 of the wall 22. A cap G is formed between the second end 35B of the siphon tube 32 and the base portion 30 of the wall 22. In the example of FIG. 1, the wall 22 and siphon tube 32 are concentric and share a same central longitudinal axis A.

Within the inner chamber 24, a suppressant 36 is disposed beneath a pressurant 38. The pressurant 38 is a gas, such as nitrogen, that pressurizes the suppressant 36, and causes the suppressant 36 to travel through the siphon tube 32 and through the valve 34 upon opening of the valve 34. The output valve 34 may be fluidly connected to an output channel 40, such as an output manifold, for dispensing the suppressant 36. The suppressant 36 can be a clean agent (e.g., Novec 1230), a wet chemical, or a dry chemical, for example. The wall 22 and siphon tube 32 are each in contact with both of the suppressant 36 and the pressurant 38 in the inner chamber 24. A height of the pressurant 38 in the cylinder 12 is represented by length $\ell_1$, and a height of the suppressant 36 within the cylinder 12 is represented by length $\ell_2$.

The wall 22 of the cylinder 12 and the siphon tube 32 are both electrically conductive, and because of their relative proximity to each other, and the suppressant 36 and pressurant 38 between them, the wall 22 and siphon tube 32 can each operate as an electrode of a capacitor. If a voltage difference is applied between the wall 22 and siphon tube 32, an electric field is formed therebetween, and a fringing effect of the electric field lines is produced.

The suppressant 36 and pressurant 38 have different dielectric constants ($\varepsilon_1$ for the pressurant 38 and $\varepsilon_2$ for the suppressant 36) and act as separate dielectric mediums. As the amount of suppressant 36 in the cylinder 12 is lowered (e.g., through suppressant dispensing), the pressurant 38 gas displaces the suppressant 36 and changes the capacitance between the wall 22 and siphon tube 32.

The capacitance sensor 14 is operable to measure a capacitance between the wall 22 and siphon tube 32, and provide a signal indicative of that capacitance to signal processing circuit 16. The signal processing circuit 16 processes that signal (e.g., by filtering and/or amplifying the signal) and provides a processed signal to the processor 18, which determines an amount of suppressant 36 in the inner chamber 24 based on the capacitance between the wall 22 and siphon tube 32.

The processor 18 is operable to display an indication of the amount of suppressant 36 within the cylinder 12 on an electronic display 20, which may be an organic light-emitting diode (OLED) display, for example. The indication could include a color corresponding to the level (e.g., green for a first amount of suppressant 36, yellow for a second, smaller amount of suppressant 36, and red for a third, even smaller amount of suppressant 36). In one example the suppressant amount is indicated as a height of the suppressant 36 within the inner chamber 22 (e.g., magnitude of $\ell_2$) and/or a weight of the suppressant 36 within the inner chamber 22.

The processor 18 can be a microcontroller, microprocessor, application-specific integrated circuit (ASIC), or the like.

The capacitance measured by the capacitance sensor 14 represents an effective capacitance $C_{\mathit{eff}}$ that is based on a first capacitance C1 between the wall 22 and siphon tube 32 with the pressurant 38 as a dielectric medium, a second capacitance C2 between the wall 22 and siphon tube 32 with the suppressant 36 as a dielectric medium, and a stray capacitance CS of each of the wall 22 and siphon tube 32, as shown in equation (1) below.

$$C_{\mathit{eff}} = C_1 + C_2 + C_S \qquad \text{equation (1)}$$

Figure 2:
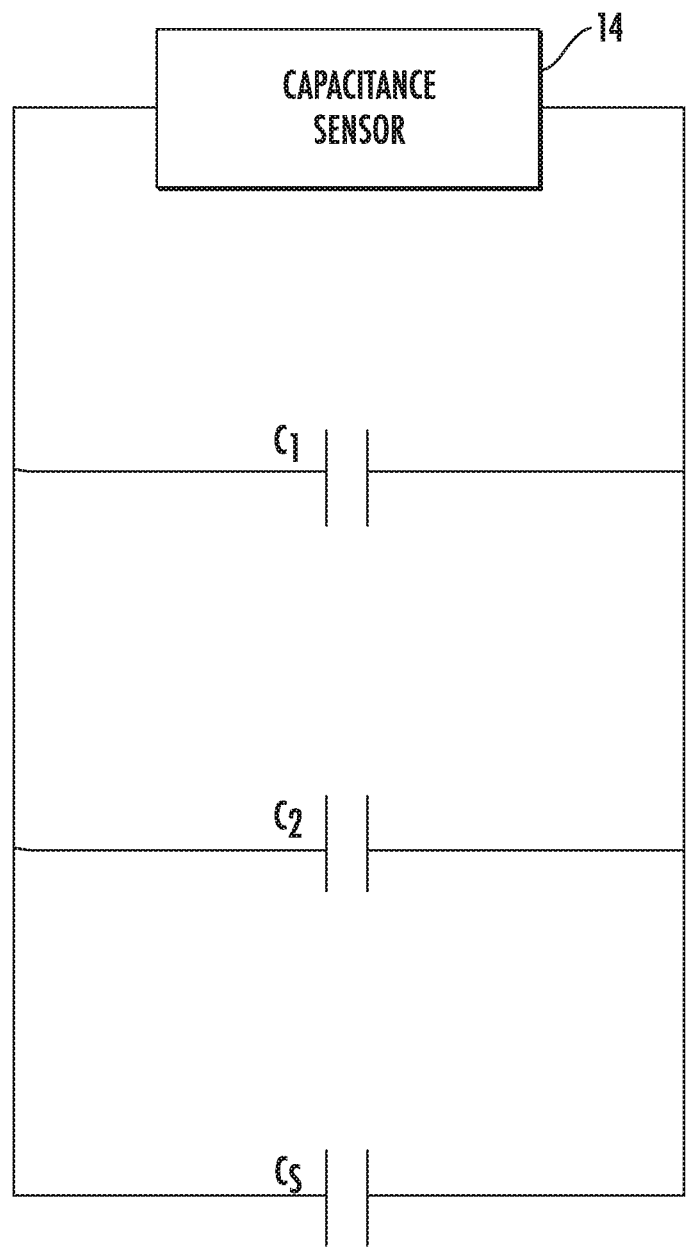
FIG. 2 is a schematic view of a plurality of capacitances of the fire suppression system.

FIG. 2 schematically illustrates the capacitance values C1, C2, and CS. The capacitances C1 and C2 can be calculated using equations (2)-(3) below.

$$C_1 = \frac{2\pi\varepsilon_1 \ell_1}{\ln\left(\frac{R_2}{R_1}\right)} \qquad \text{equation (2)}$$

$$C_2 = \frac{2\pi\varepsilon_2 \ell_2}{\ln\left(\frac{R_2}{R_1}\right)} \qquad \text{equation (3)}$$

where $\varepsilon_1$ is the dielectric constant of the pressurant 38;
$\varepsilon_2$ is the dielectric constant of the suppressant 36;
R1 is an inner radius of the cylinder 12;
R2 is an outer radius of the siphon tube 32;
$\ell_1$ is the height of the pressurant 38 within the cylinder 12; and
$\ell_2$ is the height of the suppressant 36 within the cylinder 12.

Figure 3:
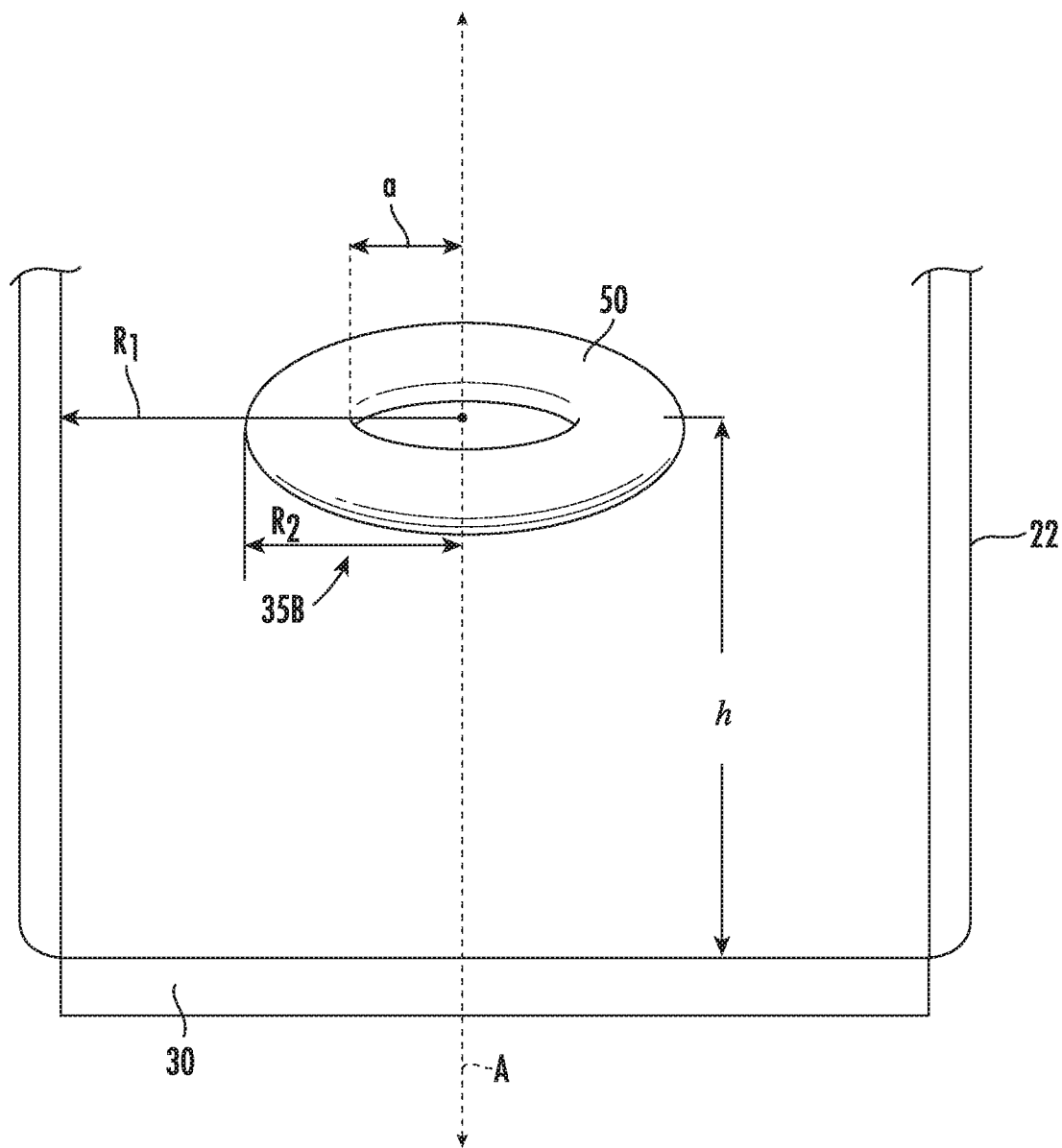
FIG. 3 schematically illustrates an end of a siphon tube of the fire suppression system as a toroidal ring.

FIG. 3 schematically illustrates the second end 35B of the siphon tube 32 as a toroidal ring, along with parameters R1 and R2 from equations 1-2 above.

The stray capacitance CS is based on a size of the gap G between the second end 35B of the siphon tube 32 and the base portion 30 of the wall 22, and can be calculated using equation (4) below, which considers the end 35B of the siphon tube 32 as a circular toroidal ring (as shown in FIG. 3).

$$C_S = \frac{4\pi^2 \varepsilon_2 R}{\ln\left(\frac{8*R}{a}\right) - K(k^2)*k} \quad \text{equation (4)}$$

where: K is an elliptical integral of the first kind;
k is a constant that can be calculated using equation (5) below; and
a is an inner radius of the siphon tube 32.

$$k^2 = \frac{R^2}{R^2 + h^2} \quad \text{equation (5)}$$

where: R is equivalent to the outer radius R2 of the siphon tube 32; and
h is a size of the gap G.

Another way of representing the stray capacitance CS is based on its constituent components C3 which represents a stray capacitance of the wall 22, and C4 which represents a stray capacitance of the siphon tube 32, as shown in equation (6) below.

$$C_S = \frac{C_3 * C_4}{C_3 + C_4} \quad \text{equation (6)}$$

Another way of representing the effective capacitance Ceff is with equation (5) below.

$$C_{eff} = \frac{C_3 * C_4}{C_3 + C_4} + C_1 + C_2 \quad \text{equation (5)}$$

where: C1 and C2 are the same as described above;
C3 is a stray capacitance of the wall 22; and
C4 is a stray capacitance of the siphon tube 32.

In one example, the processor 18 is configured to determine the amount of suppressant 36 in the inner chamber 24 based on a predefined mapping between capacitance values and suppressant amounts for the cylinder 12. One example mapping is provided below in Table 1, which maps suppressant levels to corresponding effective capacitance values in picofarads for the suppressant Novec 1230 in a 125 pound cylinder. As shown in the table, the effective capacitance varies with the suppressant level, with decreasing suppressant levels yielding decreased effective capacitance values.

TABLE 1

| Suppressant level in inches | Effective capacitance in pF |
| --- | --- |
| 1 | 38.67 |
| 2 | 39.52 |
| 3 | 40.38 |
| 4 | 41.24 |
| 5 | 42.1 |
| 6 | 42.95 |
| 7 | 43.81 |

TABLE 1-continued

| Suppressant level in inches | Effective capacitance in pF |
| --- | --- |
| 8 | 44.67 |
| 9 | 45.53 |
| 10 | 46.38 |
| 11 | 47.24 |
| 12 | 48.1 |
| 13 | 48.96 |
| 14 | 49.81 |
| 15 | 50.67 |
| 16 | 51.53 |
| 17 | 52.39 |
| 18 | 53.24 |
| 19 | 54.1 |
| 20 | 54.96 |
| 21 | 55.82 |
| 22 | 6.67 |
| 23 | 57.53 |
| 24 | 58.39 |
| 25 | 59.25 |
| 26 | 60.1 |
| 27 | 60.96 |
| 28 | 61.82 |
| 29 | 62.68 |
| 30 | 63.53 |
| 31 | 64.39 |
| 32 | 65.25 |

Figure 4:
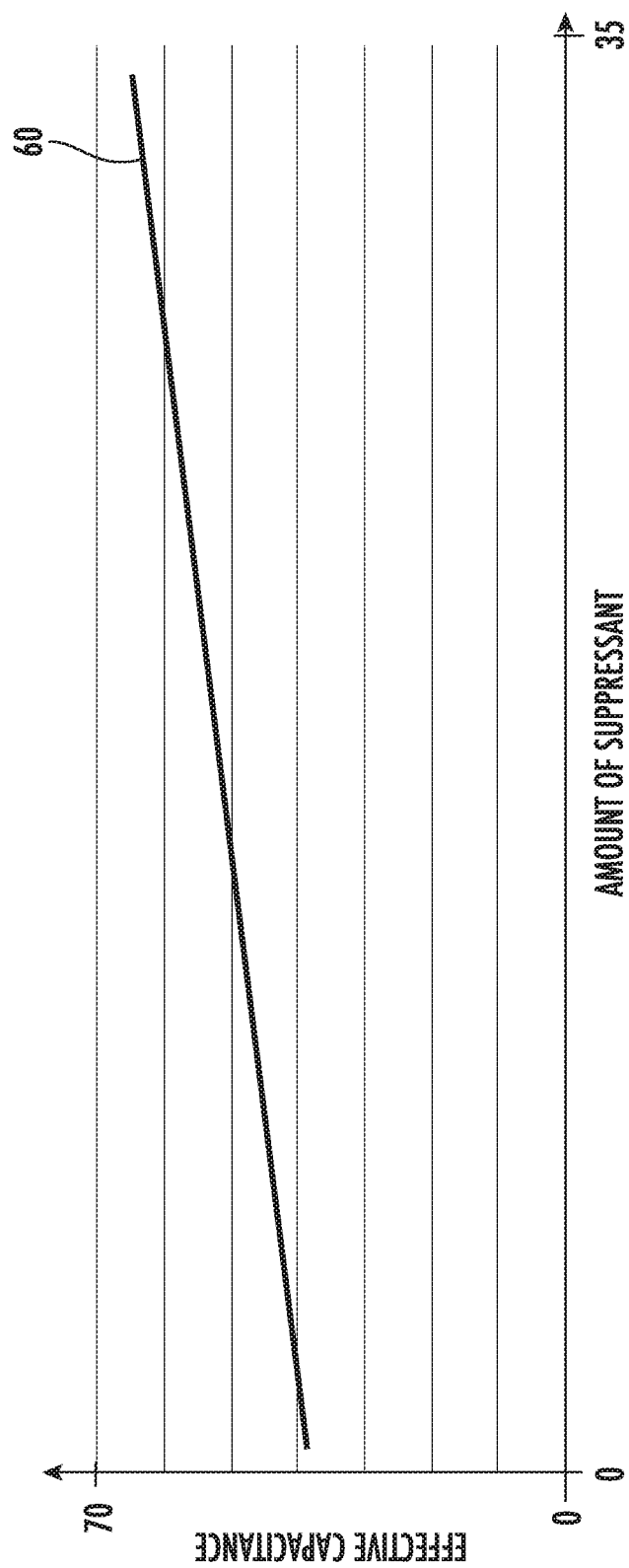
FIG. 4 is a graph plotting example capacitance values for example suppressant levels.

FIG. 4 is a graph that plots the values of FIG. 4, and demonstrates how the relationship between effective capacitance and suppressant level, shown on plot 60, is generally linear.

Another example mapping could map capacitance values to suppressant weight values in the inner chamber 24.

Although the cylinder 12 and the siphon tube 32 have been discussed as example electrodes for the sensing technique discussed above, it is understood that these are only examples, and that other electrodes could be used if desired.

The system described herein confers a number of benefits, including suitability for both seamless and welded fire suppression cylinders. Also, because little modification is needed to the current infrastructure for fire suppression cylinders, the system described herein is well-suited for retrofitting into existing suppression cylinders. The linearity in sensing shown in FIG. 4 provides for reliable sensing, and using the wall 22 and siphon tube 32 as electrodes provides for improved sensor life as compared to prior art sensors. Still further, the detection system 10 provides for convenient real time monitoring.

Although example embodiments have been disclosed, a worker of ordinary skill in this art would recognize that certain modifications would come within the scope of this disclosure. For that reason, the following claims should be studied to determine the scope and content of this disclosure.

What is claimed is:
1. A fire suppression system, comprising:
a cylinder having a wall defining an inner chamber;
a siphon tube disposed within the inner chamber and spaced apart from the wall;
the siphon tube comprises opposing first and second ends, the first end coupled to an output of the cylinder, the second end proximate to a base portion of the wall, the cylinder including a gap between the second end and the base portion; and
a processor operable to determine an amount of a suppressant in the inner chamber based on a capacitance between a first electrode and a second electrode that are both in contact with the suppressant;
wherein:

one of the first and second electrodes includes the siphon tube, and the other of the first and second electrodes includes the wall;

each of the first electrode and second electrode is also in contact with a pressurant in the inner chamber;

the capacitance is an effective capacitance based on a first capacitance between the first and second electrodes with the suppressant as a dielectric medium, and a second capacitance between the first and second electrodes with the pressurant as a dielectric medium; and the effective capacitance is also based on a stray capacitance of each of the siphon tube and the wall, and the stray capacitance is indicative of a size of the gap.

2. The fire suppression system of claim 1, wherein the siphon tube and cylinder are concentric.

3. The fire suppression system of claim 1, wherein the determination of the amount of suppressant in the inner chamber is based on:
a radius of the siphon tube;
a radius of the cylinder;
a dielectric constant of the suppressant;
a dielectric constant of the pressurant; and
a size of the gap between the base portion of the cylinder and the second end of the siphon tube.

4. The fire suppression system of claim 1, wherein the processor is operable to determine the amount of suppressant in the inner chamber based on a predefined mapping between capacitance values and suppressant amounts for the cylinder.

5. The fire suppression system of claim 1, comprising:
an electronic display, the processor operable to display an indication of the amount of suppressant on the electronic display.

6. The fire suppression system of claim 1, comprising:
a measuring circuit operable to measure the capacitance between the first and second electrodes and provide the measured capacitance to the processor.

7. A method for determining an amount of suppressant in a cylinder, comprising:

measuring a capacitance between a first electrode and a second electrode that are both in contact with a suppressant within a cylinder; and a determining an amount of suppressant within the cylinder based on the capacitance;

wherein:
each of the first electrode and second electrode is also in contact with a pressurant within the cylinder;

the capacitance is an effective capacitance based on a first capacitance between the first and second electrodes with the suppressant as a dielectric medium, and a second capacitance between the first and second electrodes with the pressurant as a dielectric medium; and said measuring a capacitance between a first electrode and a second electrode comprises utilizing a wall of the cylinder as one of the first and second electrodes, and utilizing a siphon tube disposed within the cylinder as the other of the first and second electrodes; and said determining an amount of suppressant within the cylinder is based on each of the following:
a radius of the siphon tube;
a radius of the cylinder;
a dielectric constant of the suppressant;
a dielectric constant of the pressurant; and
a size of a gap between a base portion of the cylinder and an end of the siphon tube.

8. The method of claim 7, wherein the effective capacitance is also based on a stray capacitance of each of the first and second electrodes.

9. The method of claim 7, wherein said measuring a capacitance between a first electrode and a second electrode comprises utilizing a wall of the cylinder as one of the first and second electrodes, and utilizing a siphon tube disposed within the cylinder as the other of the first and second electrodes.

10. The method of claim 7, wherein said a determining an amount of the suppressant within the cylinder based on the capacitance is performed using a predefined mapping between capacitance values and suppressant amounts for the cylinder.

* * * * *